Sept. 1, 1925.
D. BIRD
SAFETY DEVICE FOR ELEVATORS
Filed July 2, 1924   3 Sheets-Sheet 1
1,552,263
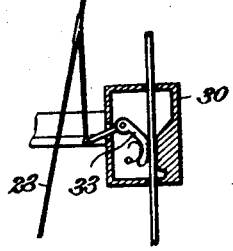
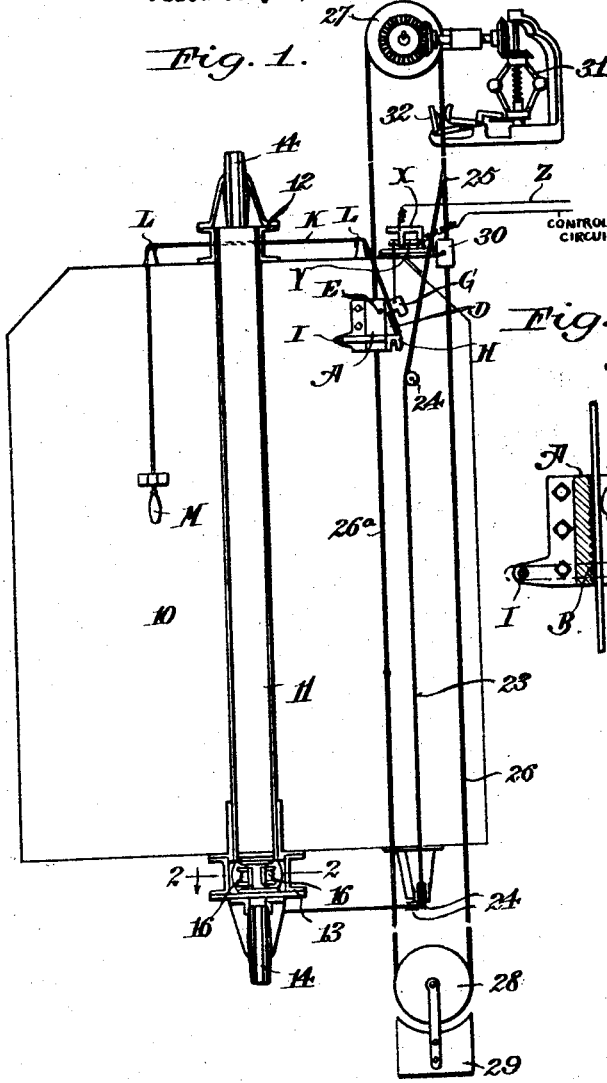
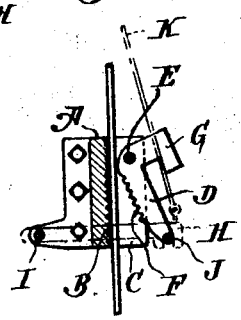
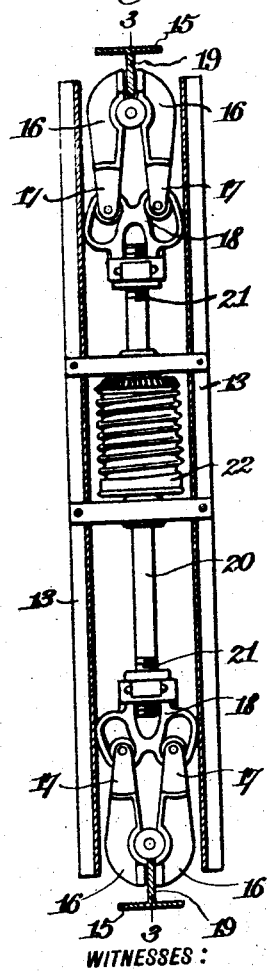
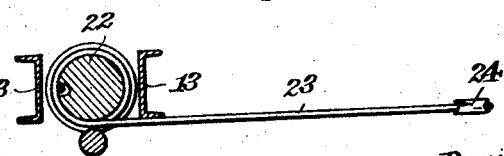
INVENTOR,
Douglas Bird.
BY
ATTORNEYS.

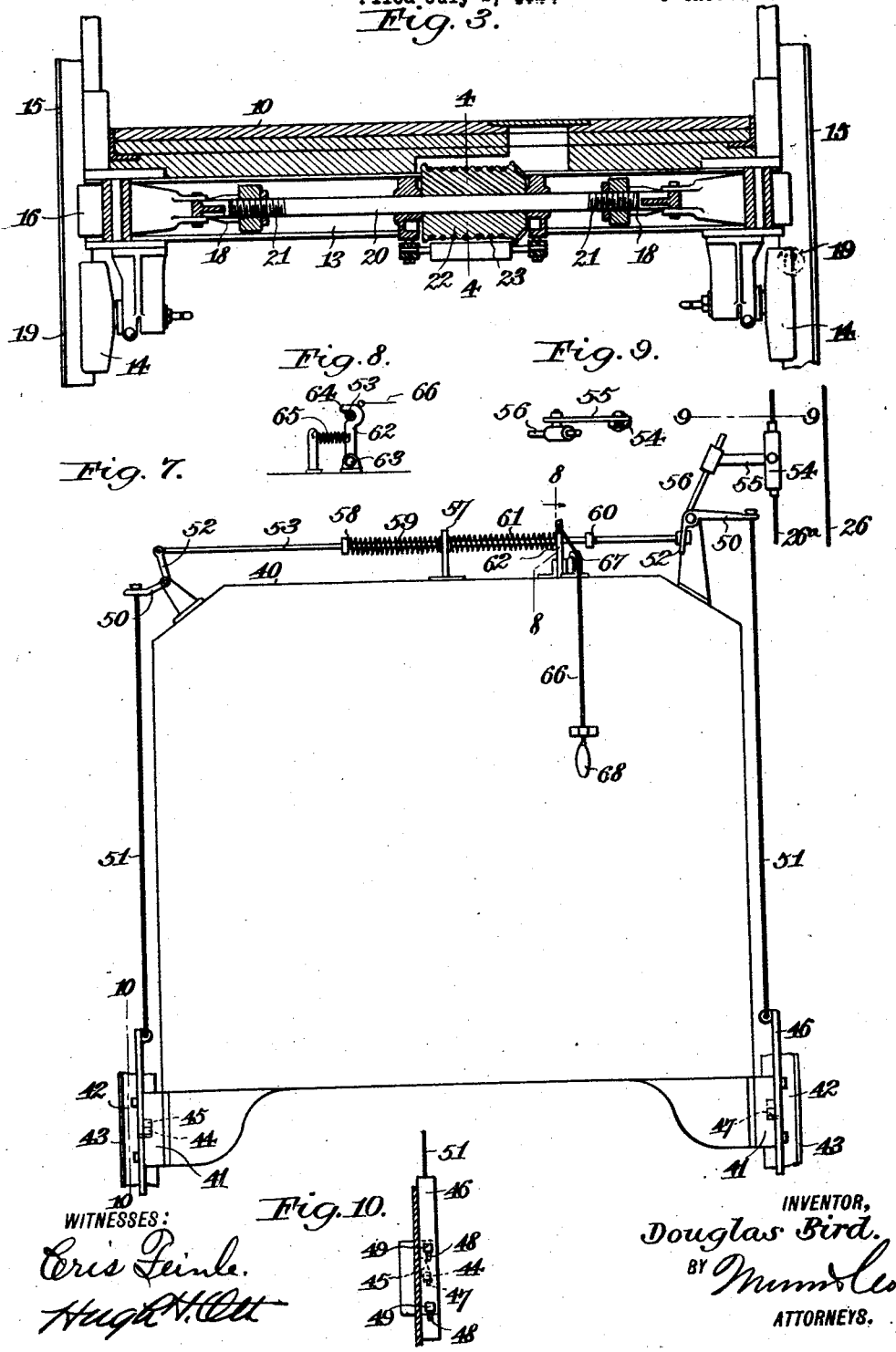

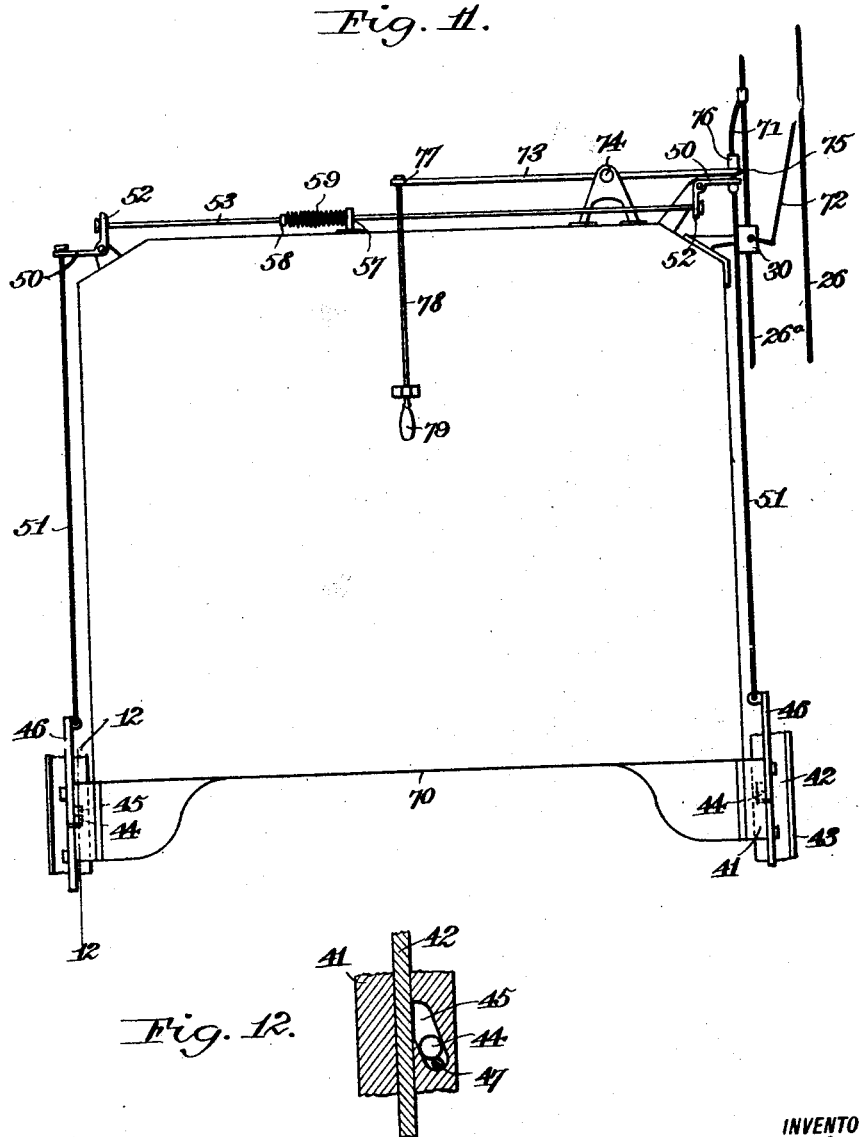

Patented Sept. 1, 1925.

1,552,263

UNITED STATES PATENT OFFICE.

DOUGLAS BIRD, OF EDGEWATER, NEW JERSEY.

SAFETY DEVICE FOR ELEVATORS.

Application filed July 2, 1924. Serial No. 723,768.

*To all whom it may concern:*

Be it known that I, DOUGLAS BIRD, a citizen of the United States, and a resident of Edgewater, in the county of Bergen and State of New Jersey, United States of America, have invented a new and Improved Safety Device for Elevators, of which the following is a full, clear, and exact description.

This invention relates generally to elevators and particularly to an operating attachment for use in connection with elevators equipped with automatic safety devices to prevent falling of the elevator.

It is a well known fact that little or no attention is paid to automatic safety devices for elevators subsequent to their initial test and inspection after installation and that the means which is intended to automatically actuate the safety device, usually rusts or sets through inactivity to such an extent that the same is not always dependable in an emergency. At the present time no means has been devised to manually actuate the safety device in event the automatic means fails to function.

It is therefore the outstanding object of the present invention to provide an auxiliary manually operable means for use in connection with the usual automatic safety device, whereby in event of failure of the automatic means to properly function, said safety device may be manually actuated by an auxiliary means either by the operator of the elevator or the passengers.

The invention furthermore comprehends as an attachment for an elevator, an auxiliary manually operable means for actuating the safety device thereof, which attachment is comparatively simple in its construction and mode of operation, which is inexpensive to manufacture, capable of ready installation without the necessity of material changes or alterations in the elevator or safety device, and which is thoroughly reliable and highly efficient in its purpose.

With the above recited and other objects in view, the invention resides in the novel construction set forth in the following specification, particularly pointed out in the appended claims and illustrated in the accompanying drawings it being understood that the right is reserved to embodiments other than those actually illustrated herein to the full extent indicated by the general meaning of the terms in which the claims are expressed.

In the drawings—

Figure 1 is a side view of an elevator equipped with an automatic safety device and illustrating the auxiliary manually operable means for actuating the same in event of failure of the automatic means.

Fig. 2 is a sectional plan view taken approximately on the line 2—2 of Fig. 1, illustrating one of the usual forms of safety devices with which the actuating means is employed.

Fig. 3 is a transverse section therethrough taken approximately on the line 3—3 of Fig. 2.

Fig. 4 is a sectional view therethrough taken approximately on the line 4—4 of Fig. 3.

Fig. 5 is a detail sectional view through the releasing carrier.

Fig. 6 is a detail sectional view of the governor cable gripping device constituting a part of the present invention.

Fig. 7 is a front view illustrating the auxiliary manually operable actuating means for a safety device of a different construction.

Fig. 8 is a detail sectional view taken approximately on the line 8—8 of Fig. 7.

Fig. 9 is a fragmentary detail view taken approximately on the line indicated at 9—9 of Fig. 7.

Fig. 10 is a detail view taken approximately on the line 10—10 of Fig. 7.

Fig. 11 is a front view of an elevator equipped with another form of safety device and illustrating the auxiliary manually operable actuating means therefor constituting a modification of the invention.

Fig. 12 is a fragmentary sectional view taken approximately on the line indicated at 12—12 in Fig. 11.

In order to bring out the cooperation of the manually operable actuating means in connection with an elevator safety device, it is essential to illustrate the usual safety device and automatic means for operating the same, although it forms no part of the present invention. Referring to the drawings and more particularly to Figs. 1 to 6 inclusive, 10 designates the cage or cab of an elevator carried by the usual sling which includes the side stiles 11, the upper crosshead 12 and the lower safety plank 13. The upper crosshead 12 and lower safety plank 13 have attached to their opposite ends the usual shoes 14 which cooperate with the usual guide rails or tracks 15. The safety device in this instance which is one of the standard types, consists of a pair of clamping jaws 16 carried by the outer ends of the safety plank, the operating terminals 17 of which are operatively controlled by the sliding toggles 18 for opening and closing the jaws 16 to respectively release or grip the web 19 of the guide rails 15. The sliding of the toggles 18 is effected by the rotation of a shaft 20, the threaded opposite ends 21 of which engage the toggles 18. The drum 22 is keyed to the medial portion of the shaft 20 and has attached and wound thereupon one end of an operating cable 23 which is trained over guide sheaves 24 on the cage or cab. The opposite end of the cable is permanently connected as at 25 to the usual governor cable 26, said governor cable being trained over a stationary upper sheave or pulley 27 and a lower sheave or pulley 28 which supports the governor tension weight 29. A releasing carrier 30 carried by the cage or cab 10 normally grips one of the leads of the governor cable 26 whereby said governor cable moves with the cage or cab under normal conditions. The upper sheave or pulley 27 is operatively connected with a centrifugal governor 31 which governor in turn is operatively connected with a clutch 32 through which the governor cable 26 is trained. The theory of operation of an automatic safety device of this type is that in event of the descent of the cage or cab at an abnormal rate of speed, the governor 31 will actuate the clutch 32 to grip and arrest the movement of the cable with the cage. The cable 23 which is wound upon the drum 22 is operatively connected with the gripping jaw 33 of the releasing carrier 30 so that said jaw 33 is released and the governor cable 26 held stationary and the cage moving downwardly, it will be observed that the permanently connected point 25 of the cable 23 will cause said cable 23 to unwind from the drum 22. This rotates the drum 22 and shaft 20 to which it is keyed, whereby through the threaded extremities 21 the toggles 18 move outwardly to effect relative separation of the terminals 17 and causing the jaws 16 to rip the web 19 of the guide rails.

As heretofore explained, in event of the failure of the automatic actuating means to properly function, there has been no manual means provided heretofore and in order to provide such means, use is made of the following device constituting the invention. The auxiliary manually operable means comprises a substantially U-shaped member A attached to the cage 10 and through which the lead 26$^a$ of the governor cable is trained. The inner face of the bight of the member A is provided with teeth or serrations B and between the side arms C of the member A a gripping jaw D is pivoted as at E, said gripping jaw having complementary teeth or serrations F. The gripping jaw is provided with a weighted arm G which operates to gravitationally swing the jaw D to a position whereby its serrated or toothed face F will cooperate with the toothed or serrated face B of the bight to grip the lead 26$^a$ of the governor cable. In order to normally positively retain the gripping jaw in a non-gripping position against the action of the weighted arm G, a hook H is provided which is pivoted as at I to the member A, said hook engaging a keeper lug J on the free end of the gripping jaw D. In order to provide means for manually disengaging the hook H from the keeper lug J to permit the gripping jaw D to function, a cable or flexible element K is attached at one end to the hook H and is trained over guides L with its free end depending into the cage and provided with a pull handle M located within convenient reach of the elevator operator or passengers.

In use and operation of the device, in event of failure of the automatic means to function, the safety device may be actuated by exerting a pull on the cable K, which will lift the hook to disengage it from the keeper lug J. The weighted arm G will effect the gravitational swinging of the jaw D to effect the gripping of the lead 26$^a$ which in turn will arrest the downward movement of the opposite lead of the cable 26 to effect the disengagement of the releasing carrier 30 and exert a relative upward pull on the cable 23 to unwind the same from the drum 22 and actuate the gripping of the jaw 16 on the webs 19 of the guide rails 15. This serves to manually actuate the safety device in lieu of the automatic clutch.

In Figs. 7 to 10 inclusive there is illustrated a different type of safety mechanism and a modified form of auxiliary manually operable means for actuating the same. In this instance the cage or cab 40 is provided with shoes 41 which cooperate with the webs 42 of the guide rails 43. In this instance, however, the means for gripping the webs 42 of the guide rails consists of a serrated roller 44 mounted in an inclined slot 45 in the shoe. A slide bar 46 having a lifting pin 47 is mounted for sliding movement through the medium of guide slots 48 and guide bolts 49. The upper end of each slide bar 46 is connected to one arm 50 of a bell crank by a cable or rod 51 and the opposite arm 52 of each bell crank is connected by a cross rod 53 whereby said bell cranks are connected for simultaneous movement upon shifting of the rod 53 in one direction to effect a lift on the cables or rods 51, which in turn raises the serrated rollers 44 to set up a jambing and gripping action between the shoes and the webs of the guide rails. The actuating means in this instance consists of the same type of automatic governor actuated mechanism as previously described which includes the governor cable 26, the centrifugal governor 31 and clutch 32. However, in this instance in lieu of the releasing carrier the lead $26^a$ is connected permanently to the cage 40 by a member 54 having an arm 55 attached to an arm 56 of one of the bell crank levers. The rod 53 extends through a central guide bracket 57 at the top of the cage 40 and said rod is provided with a stop shoulder 58 spaced from the guide bracket 57. A coiled expansion spring 59 is interposed between the bracket 57 and stop shoulder 58 for normally holding the bell cranks in a position to maintain the slide bars 46 at the downward limit of their movement whereby the jamb rollers 44 are maintained in a release position. The action of the spring 59 also serves to maintain the arm 56 in a substantially rigid position so that the governor cable lead $26^a$ moves with the cage 40. In this form of safety device the centrifugal governor actuated gripping clutch 32 in event said automatic means operates, grips the governor cable 26 to arrest movement of the governor cable lead $26^a$ with the cage 40. It thus follows that the continued downward movement of the cage will swing the arms 50 of the bell cranks upwardly to exert an upward pull on the slide bars 46 to cause the jamb rollers 44 to function to lock and retain the cage in the shaft. In event, however, of failure of the automatic means to operate, the following manually operable means for actuating the same is employed which consists of a second shoulder or abutment collar 60 on the rod 53 disposed at the opposite side of the bracket 57 from the shoulder 58. A coiled contractile spring 61 is interposed between the bearing bracket 57 and a retaining hook 62 which is pivoted to the upper portion of the cage as at 63. The hooked terminal 64 thereof normally embraces the rod under the influence of a spring 65 whereby the spring 61 is maintained inactive, but which upon release by the swinging of the hook 62 to an out-of-the-way position permits the spring to expand against the shoulder 60 to effect simultaneous movement of the bell cranks in a direction to move the jamb rollers 44 to their active jambing position. It will, of course, be appreciated that the spring 61 is of considerably greater strength than the spring 59. In order to manually effect a swinging movement of the hook 62 to an out-of-the-way position from the interior of the cage 40, a flexible pull cable 66 is connected to the hooked terminal 64 trained over a pulley 67 and extends downwardly into the cage 40. The free end of the pull cable 66 is provided with a pull handle 68 within convenient reach of the elevator operator or passengers.

In the modified adaptation of the invention illustrated in Fig. 11 the cage 70 is provided with shoes 41 cooperating with the webs 42 of the guide rails 43 identical with the construction set forth in Fig. 7. In this instance also the slide bars 46 are provided and the same jamb rollers 44 operating in the inclined guide slots 45 are employed. Also in this instance the bell cranks provided with horizontal arms 50 are connected to the slide bars 46 by rods or cables 51 and the vertical opposite arms 52 of the bell cranks are connected by a cross rod 53 passing through a guide bracket 57 and the rod 53 is provided with a stop collar 58 between which and the bracket the coiled expansion spring 59 is interposed, normally maintaining the jamb rollers in a non-jambing position. In this instance, however, the lead $26^a$ of the governor cable 26 passes through a releasing carrier 30 constructed identically with that illustrated in Fig. 5 and said lead $26^a$ is connected by a flexible link element 71 to one of the arms 50 of the bell crank. The gripping arm 33 of the releasing carrier is connected by a cable section 72 to the other lead of the governor cable whereby when the governor actuated clutch 32 grips the governor cable to arrest further movement thereof, the releasing carrier releases the cable lead 26 and downward relative movement of the cage 70 will effect a relative upward swinging movement of the arms 50 to actuate the jamb rollers 40. In this instance, however, in event of failure of the automatic means to operate the following manually operable means for actuating the same is employed which consists of a lever 73 fulcrumed as at 74 to the upper part of the cage 70. The outer end 75 of the lever engages under a stop member 76 on the flexible link 71 and the inner end 77 thereof has attached thereto a pull cable 78 extending downwardly into the cage 70 and provided with a pull handle 79 within convenient reach of the elevator operator or passengers.

In order to provide means for cutting off the power for lowering or raising the cage, coincident with the manual operation of the safety device, a suitable switch X having a movable switch arm Y is connected with the weighted arm G of the jaw D, said switch being arranged in the control circuit Z.

From the foregoing it will thus be seen that a simple and inexpensive auxiliary manually operable means has been provided for use in connection with the usual automatic safety devices now in use on elevators, which mechanism may be readily attached to elevators now in use without material alteration thereto or initially provided on elevators newly installed.

I claim:

1. The combination with an elevator equipped with an automatic governor controlled safety device which includes means carried by the cage for gripping the guides, an endless governor cable, a releasing carrier attaching one of its leads to the cage for movement therewith and a connection between said lead and the gripping means, of an auxiliary manually operable means on the cage for gripping the lead of the governor cable opposite to that which is attached to the cage by the releasing carrier, whereby in event of failure of the automatic governor controlled means to operate in an emergency, release of the governor cable from said releasing carrier is effected independently of the operation by the governor for actuating the gripping means.

2. The combination with an elevator equipped with an automatic governor controlled safety device which includes means carried by the cage for gripping the guides, an endless governor cable, a releasing carrier attaching one of its leads to the cage for movement therewith and a connection between said lead and gripping means of an auxiliary manually operable means on the cage for manually effecting the gripping of the opposite lead of the governor cable in event of the failure of the automatic governor controlled means to operate in an emergency whereby the governor cable is released from the releasing carrier independently of the operation of the governor for actuating the gripping means, said auxiliary manually operable means comprising a guide through which the said opposite lead of the governor cable normally moves, a gravity gripping arm pivoted within the guide, a latch for holding said gravity arm in an inactive position and manipulating means for releasing said latch to permit the gripping arm to gravitate to an active position.

3. The combination with an elevator equipped with an automatic governor controlled safety device which includes means carried by the catch for gripping the guides, an endless governor cable, a releasing carrier attaching one of its leads to the cage for movement therewith and a connection between said lead and the gripping means of an auxiliary manually operable means on the cage for manually effecting the gripping of the opposite lead of the governor cable in event of the failure of the automatic governor controlled means to operate in an emergency whereby the governor cable is released form the releasing carrier independently of the operation of the governor for actuating the gripping means, said auxiliary manually operable means comprising a guide through which the said opposite lead of the governor cable normally moves, a gravity gripping arm pivoted within the guide, a latch for holding said gravity arm in an inactive position and manipulating means for releasing said latch to permit the gripping arm to gravitate to an active position, said guide and gravity arm having coacting serrated gripping faces for biting into the governor cable.

4. The combination with an elevator equipped with an automatic safety device including means carried by the cage for gripping the guides to prevent falling of the cage and a governor controlled means for actuating said device which includes an endless governor cable, a connection between one of the leads of said cable and the gripping means, a releasing carrier on the cage for normally connecting said lead with the cage for movement therewith and means operable by the governor for gripping said cable lead to effect relative movement of the cage with respect thereto by releasing the releasing carrier connection with said lead for actuating the stop means, of an auxiliary manually operable means for effecting the gripping of the opposite lead of the governor cable whereby to release the first mentioned governor cable lead from the releasing carrier to cause actuation of the stop means independent of the governor controlled means in event of failure of the automatic governor controlled means to operate in an emergency.

5. The combination with an elevator equipped with an automatic governor controlled safety device including means carried by the elevator cage for gripping the guide rails to prevent dropping of the cage, and means for actuating said safety device which includes a governor, an endless governor operating cable, a releasable connector element for normally connecting one lead of the governor cable to the cage for movement therewith, a governor actuated clutch operable by excessive speed of the governor cable for gripping the same to arrest movement thereof and effect its release from the releasable connecting element whereby relative movement between the cage and cable is effected, and a means of connection between the said lead of the governor cable and rail gripping device to effect the gripping of the rails upon said relative movement between the cage and governor cable, of an auxiliary means for manually actuating the safety device in event of failure of the automatic means to properly function, comprising a manipulating mechanism mounted on the cage within convenient reach of the operator or passengers and an element for gripping the lead of the governor cable opposite to the lead which is connected to the cage by the releasable connector element.

DOUGLAS BIRD.